US006896398B2

(12) United States Patent
Chambers et al.

(10) Patent No.: US 6,896,398 B2
(45) Date of Patent: May 24, 2005

(54) SIMULATED NEON ILLUMINATION DEVICE USING END-LIT WAVEGUIDE (75) Inventors: Joe A. Chambers, Cookeville, TN (US); Mark J. Cleaver, Wilmette, IL (US); John R. Dominick, Cookeville, TN (US); George R. Hulse, Cookeville, TN (US)

(73) Assignee: iLight Technologies, Inc., Evanston, IL (US)

( * ) Notice: Subject to any disclaimer, the term of this patent is extended or adjusted under 35 U.S.C. 154(b) by 28 days.

(21) Appl. No.: 10/417,789

(22) Filed: Apr. 17, 2003

(65) Prior Publication Data
US 2003/0198061 A1 Oct. 23, 2003

Related U.S. Application Data (63) Continuation-in-part of application No. 09/844,212, filed on Apr. 27, 2001, now Pat. No. 6,550,652, which is a continuation-in-part of application No. 09/982,705, filed on Oct. 18, 2001, now Pat. No. 6,592,238.

(51) Int. Cl.$^7$ .................................................. F21V 7/04
(52) U.S. Cl. .................... 362/555; 362/558; 362/582; 362/27
(58) Field of Search .................... 362/551–552, 362/555, 511, 582, 560, 217, 31, 27

(56) References Cited

U.S. PATENT DOCUMENTS

| 4,422,719 A | | 12/1983 | Orcutt | |
|---|---|---|---|---|
| 4,637,686 A | * | 1/1987 | Iwamoto et al. | 385/128 |
| 4,936,668 A | * | 6/1990 | Mori | 385/31 |
| 5,140,220 A | | 8/1992 | Hasegawa | |
| 5,581,683 A | | 12/1996 | Bertignoll et al. | |
| 5,677,972 A | * | 10/1997 | Popovich | 385/31 |
| 5,818,998 A | | 10/1998 | Harris et al. | |
| 5,852,514 A | | 12/1998 | Toshima et al. | |
| 5,857,761 A | * | 1/1999 | Abe et al. | 362/551 |
| 5,931,570 A | | 8/1999 | Yamuro | |
| 5,941,626 A | | 8/1999 | Yamuro | |
| 6,075,652 A | | 6/2000 | Ono et al. | |
| 6,095,673 A | * | 8/2000 | Goto et al. | 362/582 |
| 6,217,184 B1 | | 4/2001 | Koike et al. | |
| 6,244,734 B1 | | 6/2001 | Hulse | |
| 6,268,600 B1 | * | 7/2001 | Nakamura et al. | 250/216 |
| 6,275,338 B1 | | 8/2001 | Arai et al. | |
| 6,297,906 B1 | | 10/2001 | Allen et al. | |
| 6,297,908 B1 | | 10/2001 | Suga | |
| 6,366,727 B1 | | 4/2002 | Nojiri et al. | |
| 6,406,158 B1 | | 6/2002 | Ohkawa | |
| 6,447,133 B1 | | 9/2002 | Eschke et al. | |

FOREIGN PATENT DOCUMENTS

EP 0 962 789 A2 12/1999

* cited by examiner

Primary Examiner—Sandra O'Shea
Assistant Examiner—Ali Alavi
(74) Attorney, Agent, or Firm—Stites & Harbison, PLLC; David W. Nagle, Jr.

(57) ABSTRACT

An illumination device for the simulation of neon lighting comprises a leaky waveguide rod having a light-emitting lateral surface and a first set of one or more point light sources positioned adjacent one or both ends of the waveguide rod, the attenuation of light along the length of the waveguide rod being controlled such that light emitted from the lateral surface of the waveguide rod has essentially the same intensity over the length of the waveguide rod.

21 Claims, 4 Drawing Sheets

SIMULATED NEON ILLUMINATION DEVICE USING END-LIT WAVEGUIDE

This application is a continuation-in-part of U.S. application Ser. No. 09/844,212 entitled Optical Waveguide Illumination and Signage Device and Method for Making the Same filed on Apr. 27, 2001, now U.S. Pat. No. 6,550,952; and U.S. application Ser. No. 09/982,705 entitled Illumination Device for Simulation of Neon Lighting filed on Oct. 18, 2001, now U.S. Pat. No. 6,592,238. Each of these predecessor applications is incorporated herein by reference.

BACKGROUND OF THE INVENTION

The present invention relates to a simulated neon illumination device using a waveguide, and, more particularly, to a simulated neon illumination device in which high-intensity diodes are used to illuminate the respective ends of the waveguide.

Neon lighting, which is produced by the electrical stimulation of the electrons in the low-pressure neon gas-filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference. Equally important, such lighting devices must have a brightness that is at least comparable to neon lighting. Further, since neon lighting is a well established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

Aforementioned U.S. application Ser. No. 09/982,705, now U.S. Pat. No. 6,592,238, describes in detail an illumination device that utilizes high-intensity point light soirees in combination with a rod of material having "leaky" optical waveguide characteristics. For purposes of this description, a "leaky waveguide" is defined as a waveguide in which the structure and/or material is designed such that light traveling along the longitudinal length of the waveguide is caused to be diverted so as to be emitted out of the lateral surface of the waveguide. This redirection of the light can be accomplished through light scattering by the waveguide material itself or through structural designs of the waveguide. In U.S. application Ser. No. 09/982,705, now U.S. Pat. No. 6,592,238, the point light sources are aligned near one lateral surface of the waveguide rod such that emitted light is directed into the lateral surface, is preferentially scattered along the length of the waveguide rod, and exits in a very uniform pattern out of the lateral surface of the waveguide rod facing the observer of the light. The intensity and the uniformity of the exiting light approaches that of neon tubing. Moreover, the tubing is light, very resistant to breakage, and has very light supporting infrastructure. The operating temperature of the illumination device is also significantly less than typical neon lighting and may be used in aqueous environments.

The simulated neon lighting as described above and in the aforementioned co-pending application does require that the point light sources be aligned along substantially the entire length of the optical waveguide rod to provide for the proper and acceptable simulation of neon lighting. For long lengths of waveguide, large numbers of point light sources are required with commensurate lengths of light-directing structure for efficiently directing emitted light into the light receiving surface of the waveguide rod. The additional numbers of point light sources and light-directing structure increases manufacturing and material costs, particularly for long lengths of waveguide rods. Thus, it would be desirable to have an illumination device in which the additional costs could be substantially reduced.

Figure 1A:
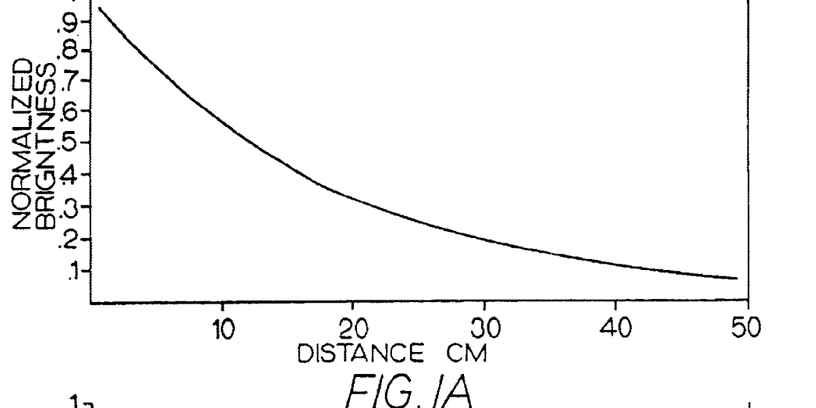
FIG. 1A is a graph depicting the intensity of light emitted from the lateral surface of an end-lit leaky waveguide rod with LEDs illuminating one end as a function of the distance from the light source.
Figure 1B:
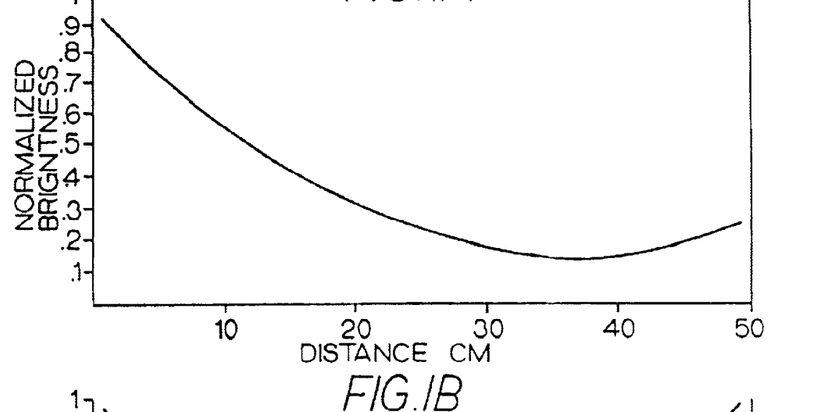
FIG. 1B is a graph like that of FIG. 1A depicting the intensity of light emitted from the lateral surface of an end-lit leaky waveguide rod with LEDs illuminating and with a reflecting cap at the other end.

An illumination device using the aforementioned leaky waveguide that is illuminated at the ends of the waveguide rod is described in U.S. application Ser. No. 09/844,212, now U.S. Pat. No. 6,550,652. This application sets forth various techniques to direct the light out of the lateral surface of the waveguide, including the use of reflective strips or painted stripes along a portion of the lateral surface to help direct light incident on the strip or painted stripes out of the lateral surface largely opposite to the portion supporting the reflective strips or painted stripes. Other techniques for causing the waveguide to leak light laterally are also described including notching the lateral region or providing holographic layers of material. Still another disclosed technique is the use of material such as DR acrylic material to cause the described scattering of the light out of the lateral surface of the waveguide rod. The end-lit illumination device thus has many applications, particularly when used to illuminate script or designs on the light-emitting lateral surface of the waveguide. However, the use of end-lit configurations in an attempt to simulate neon lighting, particularly when longer lengths are needed, have resulted in a significant problem due to the pronounced attenuation of the light toward the center of the illumination device. Part of this noticeable attenuation can be attributed to the relative weak luminosity of the present generation of LEDs, typically up to approximately 120 lumens. As the length of the leaky waveguide rod is increased, the attenuation becomes much more noticeable. FIG. 1A illustrates graphically the normalized brightness as a function of the distance from the LEDs in a typical leaky end-lit waveguide as described in the aforementioned patent application Ser. No. 09/844,212, now U.S. Pat. No. 6,550,652. As shown, the brightness or intensity of the light decreases significantly after a short distance. This attenuation of the light intensity is due in part to the absorption of the light by the material comprising the waveguide rod and the continuous loss of light due to the designed leaking of light out of the treated waveguide rod. When a reflecting cap is placed over the end opposite the light source to reflect back, the light successfully traveling the length of the waveguide rod, an observer will see light being emitted by the lateral surface of the rod with the intensity of the light falling progressively off from the end closest to the light source and then rising slightly toward the reflecting end, as illustrated graphically in FIG. 1B. The slight increase is believed to be due to the leaking of the reflected light along the length of the waveguide immediately adjacent to the reflecting cap.

To some extent, the intensity and attenuation problems can be partially addressed by using two LEDs groups, respectively housed adjacent and illuminating each end of the waveguide rod. Using two LED groups is particularly beneficial with extended lengths of the leaky waveguide rod.

Figure 1C:
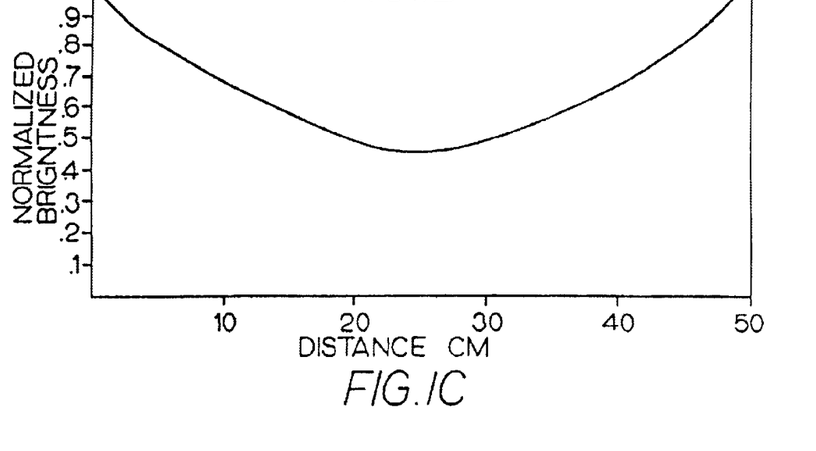
FIG. 1C is a graph like that of FIG. 1A depicting the intensity of light emitted from the lateral surface of an end-lit leaky waveguide rod with LEDs illuminating each end of the waveguide rod.

Since the total light flux entering the waveguide rod is increased two-fold, the intensity of the light being emitted along the lateral surface is noticeably brighter. Aforementioned U.S. Pat. application Ser. No. 09/844,212, now U.S. Pat. No. 6,550,652 illustrates a leaky waveguide rod with two groups of LEDs. FIG. 1C is an attenuation graph representing a waveguide rod with a LED positioned at each end, illustrating the resultant intensity curve for such a configuration. Unfortunately, while the overall intensity is increased as compared to a waveguide rod lit at only one end, the resultant intensity curve clearly demonstrates that the undesirable attenuation is still present, particularly near the midpoint of the waveguide.

Thus, it is a paramount object of the present invention to provide for an illumination device with an end-lit waveguide rod that approaches neon/fluorescent lighting in both uniformity of the emitted light out of the lateral surface of the rod and overall intensity, while minimizing the need for numerous LEDs as point light sources.

Still another object of the present invention is to provide for an illumination device with an end-lit waveguide rod that efficiently directs the light emitted out of the associated LEDs into one or both end of the waveguide rod and that efficiently leaks the light out of the lateral surface of the waveguide rod in a preferred direction.

Yet another object of the present invention is to provide for an illumination device with an end-lit waveguide rod that effectively addresses the problems of intensity light attenuation occurring in extended waveguide rods.

Other objects and advantages of the present invention will become readily apparent upon a reading of the detailed description along with the appended drawings.

SUMMARY OF THE INVENTION

Neon lighting has a uniform appearance over substantial the entire axial and longitudinal length of the neon tube. Said differently, the light flux emitted through the lateral surface of the tube is essentially the same at every position along the surface. Neon lighting, however, has a number of significant shortcomings including, for example, generation of considerable heat, heavy infrastructure, fragile nature of the glass tubing, and limited environments in which the neon lighting may be used. The recent availability of very high-intensity LEDs, however, has lead some to speculate about marrying such LEDs with optical waveguides to simulate neon lighting. One such promising development is the use of leaky waveguides to simulate neon lighting. Unfortunately, a significant problem occurs when attempting to use end-lit leaky optical waveguide rods to simulate neon, namely, the gradual decrease in light flux along the longitudinal length of the waveguide rod due to the natural attenuation of the light as it progresses away from the light source. To an observer, the rod would appear to grow dimmer away from the light source along the length thereof, an unacceptable result of attenuation. Applicants, however, have addressed this problem by controlling the leaking of the light out of the lateral surface so that the light flux is maintained essentially the same over the entire axial and longitudinal lengths of the waveguide rod. The leaking is controlled so that the increase in leaked light essentially compensates for the light that is lost due to attenuation. Thus, the observer would see essentially the same intensity of light at every region of the waveguide rod. One embodiment of the invention developed by Applicants to address the attenuation problem has a waveguide rod made of material incorporating certain light scattering materials with a density gradient designed to increase the scattering of light down the waveguide rod so that the flux of light being emitted from that light-emitting lateral surface of the rod has essentially the same value at every point on the lateral surface.

DETAILED DESCRIPTION OF THE INVENTION

While there are various types of optical waveguides, much literature is devoted to discussing optical waveguides having a core of transparent material with an index of refraction that is higher than the index of refraction of the material cladding the core. In such a waveguide structure, light directed into one end of the core tends to remain in the core, exiting from the other end, thus forming an optical waveguide transmitting light from one end to the other. The present invention is based upon the use of a leaky waveguide rod that allows light to be emitted out of at least a selected region of its lateral surface. Various techniques are described below that provide for a leaky waveguide structure. In cooperation with the leaky waveguide structure, high-intensity light is directed into both ends of the leaky waveguide structure to provide for the emission of light from the lateral surface region that extends substantially the entire length of the waveguide. To ensure the intensity of the "leaked" light approaches that of neon/fluorescent lighting and has the same uniformity, the light must be emitted so that the flux emitted at any point on the lateral surface is essentially the same, resulting in an observer seeing uniform light intensity over this lateral surface both in the axial and longitudinal directions. "Axial direction" is defined for purposes of this application to as the circumferential direction measured around the waveguide rod while a "longitudinal direction" means the direction along the axis between the two ends of the waveguide rod. To accomplish the requisite uniformity, the leaking of the light out of the selected lateral region must be appropriately balanced taking into consideration the power output of the light sources used at each end of the waveguide rod and the attenuation of the light as it travels through the waveguide rod.

In addressing the problem of attenuation, Applicants have largely solved the problem by altering the light-leaking characteristics along the length of a leaky waveguide so that the progressive attenuation of the emitted light is balanced by a progressively increased leaking of the light out of the light-emitting lateral surface of the waveguide rod from a minimum near the light source to a maximum a predetermined distance away from the light source in the longitudinal direction. The result is that an observer sees emitted light of uniform intensity across this observable region of the lateral surface, thus providing a neon light-like effect. The alteration of the light-leaking characteristics can be accomplished either by a structural design of the waveguide itself that promotes the progressively increased redirection of the light along the longitudinal direction through the lateral surface or by using a waveguide material that promotes the progressively increased scattering of light along the longitudinal direction.

Figure 2:
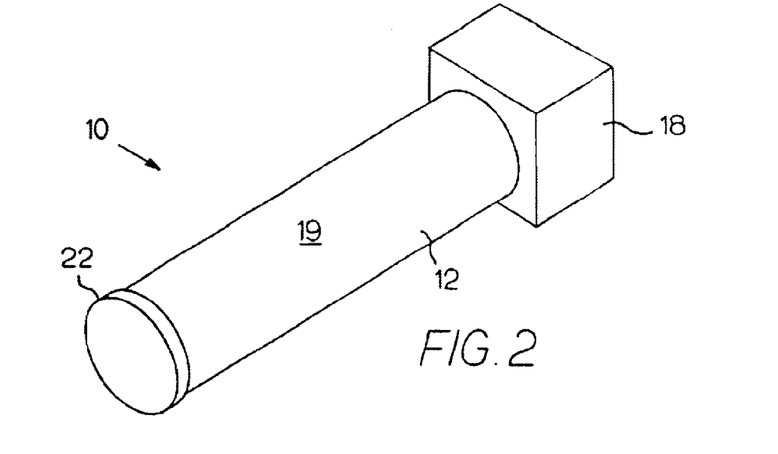
FIG. 2 is a perspective view of an end-lit leaky waveguide rod constructed in accordance with the present invention.
Figure 3:
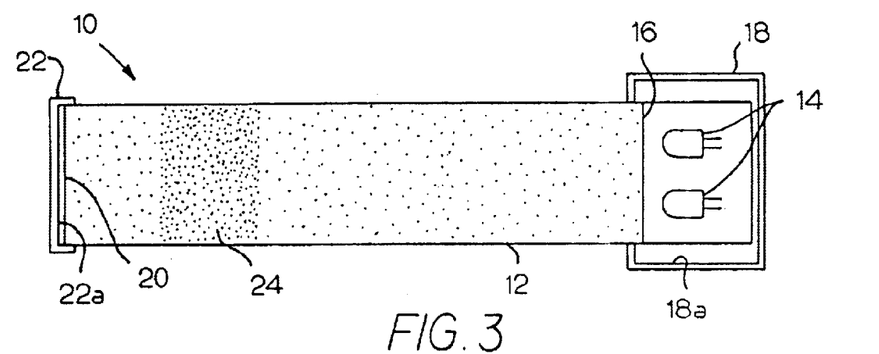
FIG. 3 is a side sectional view of the leaky waveguide rod of FIG. 2, illustrating the changing density of light-leaking elements impregnating the waveguide rod in accordance with the present invention.

A preferred embodiment of the present invention is shown in FIGS. 2 and 3 in which an illumination device, indicated generally by reference numeral 10, is comprised of a leaky waveguide rod 12 of a predetermined length that has a plurality of light-emitting diodes 14 adjacent one end 16 thereof. A housing 18 with interior reflecting surfaces 18a encloses the LEDs 14 and one end 16 of the waveguide rod 12. The opposite end 20 of the waveguide rod 12 has a cap 22 with interior reflecting surfaces 22a. The waveguide material causes the light to move from the LEDs 14 in the longitudinal direction toward the end 20 of the waveguide rod 12. Light which successfully traverses the length of the rod 12 without leaking out lateral surface 19 is reflected back toward the first end 16. As described in more detail below, the waveguide rod 12 is made of a material that has been altered to change the scattering capabilities of the material along the length of the waveguide rod 12 so that light is increasingly leaked out of the waveguide as a function of the distance from the first end 16 to a maximum in the proximity of the opposite end 20 followed by a small decrease in the scattering as the end 20 is approached.

Figure 4:
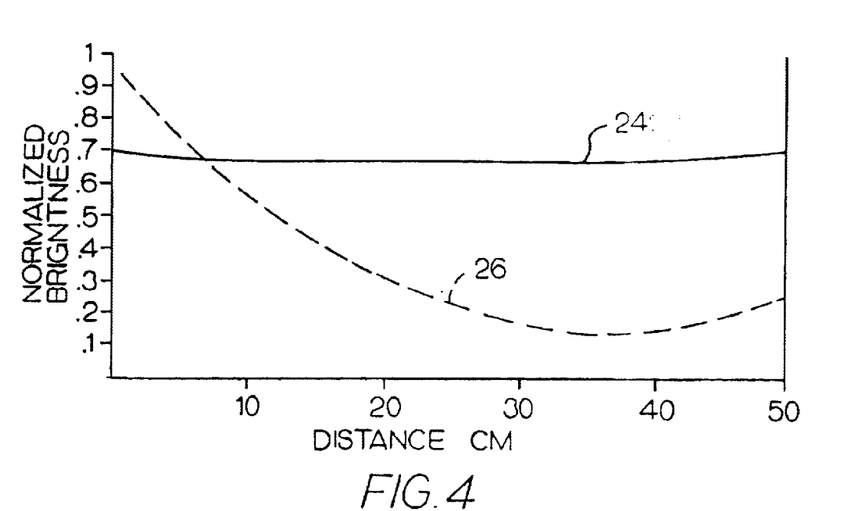
FIG. 4 is a graph of the normalized intensity of light emitted by the leaky waveguide rod of FIG. 2 as a function of the distance from the lit end of the rod.

FIG. 4 is a graph of the normalized intensity of light emitted by a leaky waveguide rod, specifically illustrating a light attenuation curve 24 of a waveguide rod with varying density scattering material as a function of its length in contrast to a typical attenuation curve 26 (dashed line) of an untreated waveguide rod. As illustrated, the curve 24 is essentially horizontal, representing the desired, essentially constant light flux along the length of the leaky waveguide rod 12. It is believed that the attenuation curve 24 reaches a minimum at a position removed from the end 20 because some light traverses the entire length of the waveguide rod 12 and is reflected back. It is thought that some leaking of this reflected light is additive to the leaking of light moving in the direction of the end 20 with the additive effect being most pronounced at the end 20.

Figure 7:
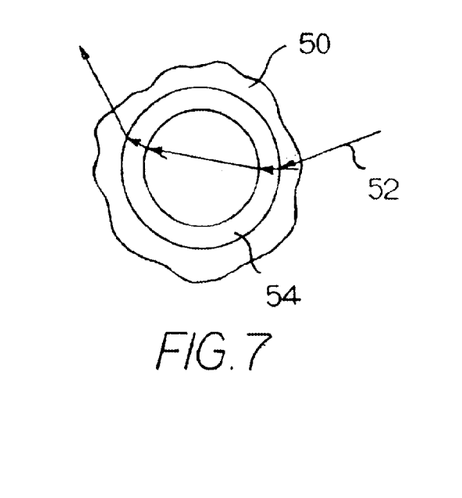
FIG. 7 schematically represents a single micro balloon of glass positioned in waveguide material and showing the change of the path of a light ray due to refraction at the interface of the various materials and air.

To accomplish the "balancing of attenuation" so as to have essentially the same light flux being emitted at all observable regions of the lateral surface 19 of the waveguide rod 12, Applicants have found that the impregnation of waveguide material, preferably urethane, with micro balloons of glass ("malloons") with a predetermined density gradient can result in the balancing. The malloons have indices of refraction differing from the index of refraction of the waveguide material (i.e., urethane in this preferred embodiment). Because light is refracted each time it crosses an interface between mediums of differing indices of refraction, some of the light moving in the longitudinal direction will be caused to scatter, i.e., to exit the waveguide rod 12 along its light-emitting lateral surface 19. The malloons are very small spheres of glass on the order of one to three hundred microns in diameter. As illustrated in FIG. 7, a light ray 52 moving down the waveguide rod (depicted generally as a portion thereof identified by character numeral 50) enters into a malloon 54 and has its direction changed significantly, causing it to exit the lateral surface of the waveguide rod 50. By selecting a proper "density gradient" of the malloons as a function of the length of the waveguide rod 50, the amount of light leaked from the waveguide rod 50 can be controlled along the length and balance the attenuation that occurs. The density of malloons, for purposes of the description of this application, is defined as the amount of malloons per unit volume of the waveguide material. Specifically, for the illumination device 10 shown in FIGS. 2 and 3, the waveguide rod 12 has a malloon density gradient that increases from a minimum adjacent the first end 16 to a maximum at a region 24 positioned close to but not at the opposite end 20. To more clearly portray this change in density gradient, specific reference is now made to FIG. 3, illustrating by the progressive darker stippling the increase in malloon density to a maximum at region 24 and then a decrease slightly toward the end 20 to compensate for the additive leaking effect of the reflected light as described above. It should be understood that the uniformity that is observed is both on the longitudinal and axial directions.

Figure 5:
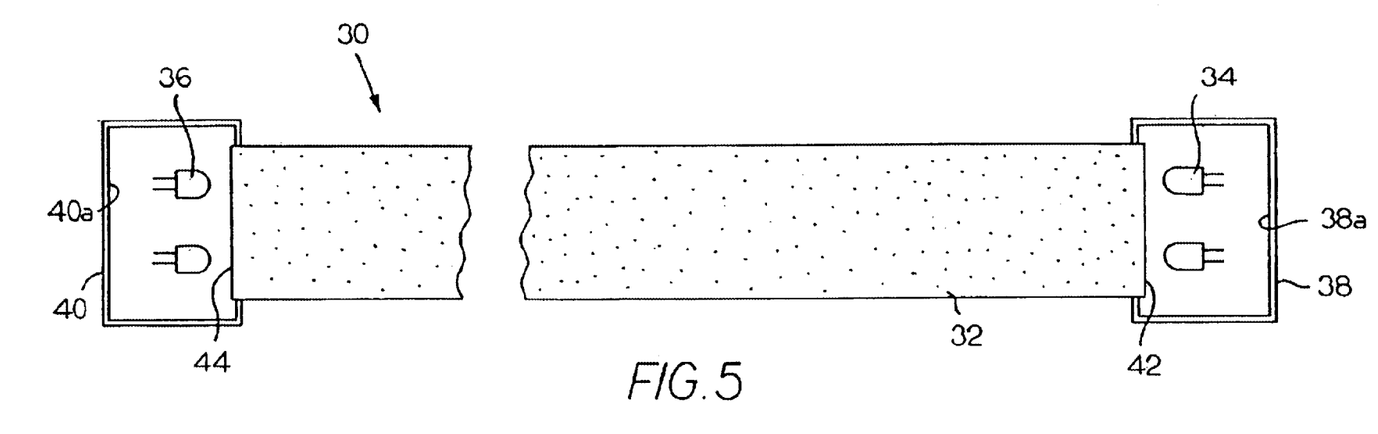
FIG. 5 is a side view of a leaky waveguide rod illuminated at both ends, further illustrating the changing density of light-leaking elements impregnating the waveguide rod in accordance with the present invention.

For long lengths of waveguide rod, it is preferable that the rod be end-fired, i.e., illuminated at both ends so that the total amount of light entering the waveguide rod is increased significantly. An illumination device 30 is illustrated in FIG. 5 in which two sets of LEDs 34, 36 are enclosed within respective housings 38, 40 about the respective ends 42, 44 of the leaky waveguide rod 32. The housings 38, 40 have interior reflecting surfaces 38a, 40a. The gradient density of the malloons within the rod 32 is portrayed by the increased stippling density that has a maximum 46 essentially at the midpoint of the rod 32. Thus, the attenuation is controlled by the appropriate manipulation of the malloon density so that a uniform light intensity is perceived by the observer over the entire observable lateral surface of the waveguide rod 32. This controlled scattering is perhaps best illustrated in the graph of FIG. 6 in which the attenuation of an untreated rod is shown by the dashed line 48 representing normalized brightness as a function of the untreated rod's length and solid line 49 representing normalized brightness as a function of the treated rod's length. As can be seen, the curved line 48 has a pronounced curvature with the minimum brightness occurring substantially at the midpoint of the rod. In contrast, the treated rod (i.e., the waveguide rod 31 illustrated in FIG. 5) has substantially uniform brightness or light intensity over the length of the rod as suggested by line 49. Of course, it should be understood that the brightness can be controlled by manipulation of the scattering characteristics along the length of the rod in essentially in any manner desired. For example, an increased brightness away from the ends of the rod could be accomplished by appropriate manipulation of the malloon density so that limited scattering occurred near the ends with more pronounced scattering at some intermediate region of the rod.

Various techniques can be used to manufacture rods having the necessary gradient density of malloons. One such technique uses a gradual increase in the metering of the malloons from a container into a flow of the viscous urethane, continuous mixing, and pouring into a mold for the solidifying of the urethane into a rod. In this manner, the density of malloons can be precisely controlled along the length of the rod. The malloons are off-the-shelf items and can be purchased, for example, from Minnesota Mining and Manufacturing Company ("3M") of St. Paul, Minn.

Recently, a new generation of LEDs with significant increases in brightness have become available in limited quantities commercially. Applicants have found that new LEDs are imminently suitable and compatible with the controlled leaking of waveguide rods. Because of the increased brightness offered by such LEDs, even extremely long lengths of simulated neon, for example, eight feet between LED light sources, are now possible when used in conjunction with the appropriate balancing of attenuation.

As an alternate to urethane materials having optical waveguide characteristics and impregnated with a predetermined density gradient of malloons, other optical waveguide materials with scattering characteristics that can be controlled may be used to balance the effects of attenuation. For example, certain acrylics called DR acrylics can be used to vary scattering along the length of the waveguide. Such acrylics are readily available and can be purchased, for example, from AtoHaas of Philadelphia, Pa. under order number DR66080. By an appropriate density gradient manipulation of the DR material component along the length of a rod formed from the acrylic, the scattering of light introduced at one or both ends of the rod may be controlled in such a manner to balance the attenuation that normally occurs along the length of the waveguide rod.

Figure 8:
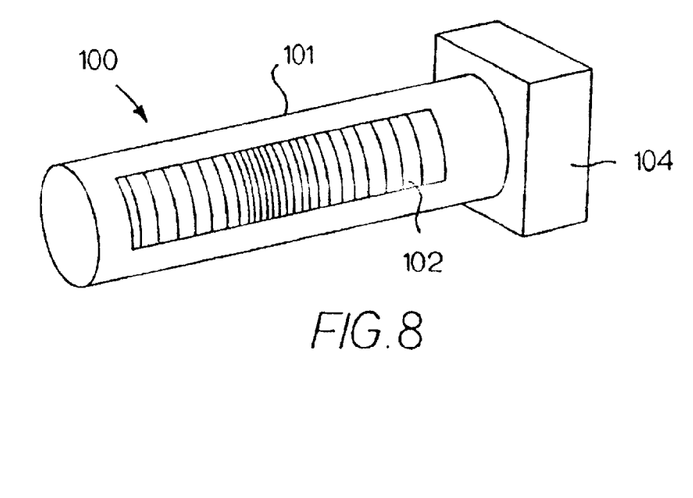
FIG. 8 is a perspective view of another embodiment of the present invention in which the light emitted laterally is controlled to address attenuation by the spacing of a plurality of grooves in the surface of the waveguide rod.

As stated above, the raison d'etre of the invention is the controlled leaking of the waveguide rod so that the attenuation problem is addressed, i.e., balanced, so that a uniform light intensity along the axial and longitudinal length of the waveguide rod is obtained. While treatment of the material comprising the waveguide rod has been identified by Applicants as one way to address the attenuation problem, Applicants have further identified other techniques for accomplishing the same result through physical alteration of the waveguide rod itself. An embodiment showing such structure is illustrated in FIG. 8, generally depicting a waveguide rod 101 that has been altered or treated along a portion of its lateral surface hidden from view of an observer. The alteration causes a scattering of light from the usual direction down the longitudinal length of the waveguide rod 101. For example, the grooving or notching of the surface of a waveguide rod to cause scattering is well known in the prior art. However, Applicants have found that the amount of scattering caused by notching can be controlled over the length of the rod in such a manner so as to balance the attenuation problem. Referring still to FIG. 8, the illumination device 100 is comprised of a waveguide rod 101 with has a series of grooves or notches 102 circumferentially extending around the waveguide rod 101 a predetermined distance and spaced apart along the length of the rod 101. By progressively increasing the number of notches per unit distance away from the LED light source (not shown) within housing 104, scattering itself is increased so as to balance the attenuation. To achieve the desired scattering, similar techniques can also be employed without departing from the spirit and scope of the present invention, including, for example, chemical etching or laser treatment of the waveguide rod.

Figures 6, 9:
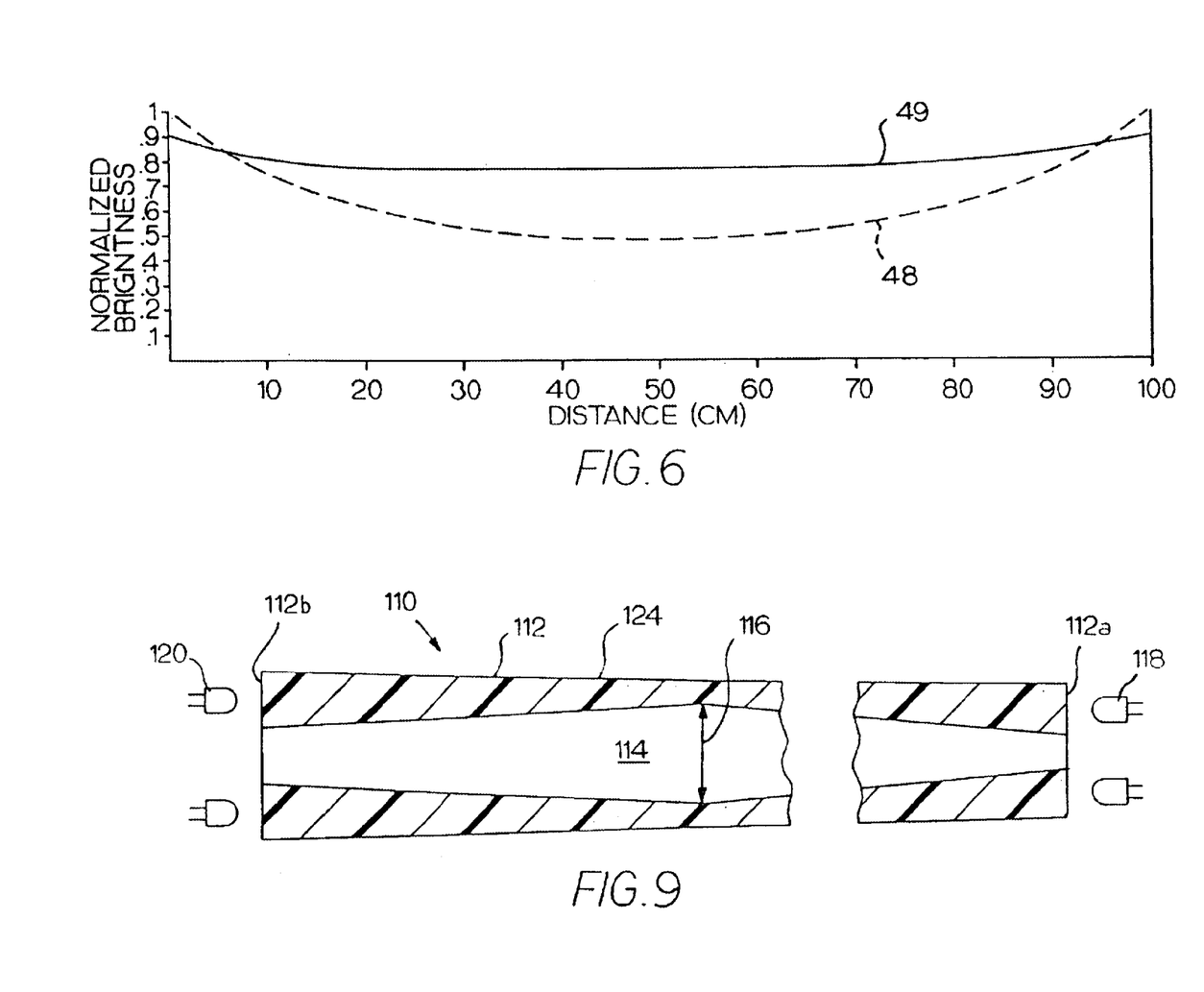
FIG. 6 is a graph of the normalized intensity of light emitted by the leaky waveguide rod of FIG. 5 as a function of the distance from the lit end of the rod.
FIG. 9 is a side view of still another embodiment of the present invention in which the light emitted laterally is controlled to address attenuation through the internal structure of the waveguide rod.

The actual structure of the waveguide may also be used to compensate for attenuation of light through the progressive "squeezing" of the light out of the lateral surface of the waveguide rod. In the embodiment of the present invention illustrated in FIG. 9, an illumination device 110 has a waveguide rod 112 annularly shaped with a central channel 114 of progressively larger internal diameter with a maximum diameter 116 at the midpoint of the rod 112. The LEDs 118, 120 positioned at the ends of rod 112 within a housing (not shown) so that light is directed into the respective end surfaces 112a, 112b. A semi-reflective coating 122 is on the inner surface that defines the channel 114. The light traversing the waveguide rod 112 from the ends thereof is progressively squeezed out of the rod 112 along its lateral surface 124 due to the combined effects of reflection and refraction. The natural attenuation of the light is balanced by the progressive squeezing so that an observer would again see essentially the same uniform intensity over the entire axial and longitudinal length of the waveguide rod 112. If demonstrated graphically, the effect would be the same as illustrated in FIG. 6.

As would be evident to those with ordinary skill in the art in view of the foregoing, other structures could be designed to cause progressive redirection of the light moving down the waveguide rod that would result not only in the leaking of the light out of the lateral surface of the waveguide rod but a balancing of the natural attenuation of the light so that an observer would see an essentially uniform intensity of light being emitted over the entire observable lateral surface of the rod.

What is claimed is:

1. An illumination device for the simulation of neon lighting, comprising a waveguide rod of an optical waveguide material incorporating micro balloons of glass having an index of refraction different from the index of refraction of said optical waveguide material, said micro balloons forming a density gradient that increases from one end of said waveguide rod along a first predetermined length, with said waveguide rod having a light-emitting lateral surface and a first set of one or more point light sources positioned adjacent the one end of said waveguide rod, said waveguide rod leaking light out of said light-emitting lateral surface at an increasing rate along its length and away from said light sources sufficient to essentially balance a rate of attenuation of light in said waveguide rod along the first predetermined length, thereby causing said light emitted from said lateral surface to have essentially the same intensity over at least a portion of said lateral surface.

2. The illumination device of claim 1, in which the optical waveguide material is DR acrylic.

3. The illumination device of claim 1, in which the optical waveguide material is urethane.

4. The illumination device of claim 1, in which a second set of one or more point light sources is positioned adjacent an opposite end of said waveguide rod, and said micro balloons form a second density gradient that increases from said opposite end along a second predetermined length, said first and second predetermined lengths intersecting one another near a midpoint of said waveguide rod.

5. The illumination device of claim 4, in which said first and second pluralities of point light sources are light-emitting diodes.

6. The illumination device of claim 5, in which said light-emitting diodes have an illuminosity of up to approximately 120 lumens.

7. The illumination device of claim 1, in which said waveguide rod has notches on said lateral surface along said first predetermined length that cause increased scattering away from said one end.

8. The illumination device of claim 1, in which said waveguide rod has an internally reflecting member covering an end surface on an opposite end to said one end, said waveguide rod being treated so that light scattering progressively increases from said one end along said first predetermined length to a predetermined point between said one end and said opposite end, and light scattering progressively increases from said opposite end to said predetermined point, whereby the intensity of light emitted by said lateral surface is substantially uniform over the entire length of said waveguide rod between said one and said opposite ends.

9. The illumination device of claim 1, in which the waveguide rod has a tubular shape with an internal channel that has a progressively increasing diameter over said predetermined length, said first set of point light sources positioned adjacent an end surface of said waveguide rod at said one end so that light is directed into said end surface and an inner surface defining said channel being partially reflective, whereby light traversing said waveguide rod is increasingly directed out of said lateral surface to balance a rate of attenuation of light in said waveguide rod, thereby providing uniform intensity of light over at least said portion of said lateral surface.

10. An illumination device for the simulation of neon lighting, comprising:

a length of urethane material having first and second ends and a light-emitting lateral surface;

a matrix of micro balloons of glass within said length of urethane having an index of refraction different therefrom, said matrix having a density gradient that increases from a minimum near said first and second ends to a maximum near a midpoint of said length; and first and second sets of light-emitting diodes associated respectively with said first and second ends of the length of urethane material for emitting light into said ends, whereby light emitted from said light-emitting surface is substantially uniformly emitted between said first and second ends.

11. The illumination device of claim 10, in which said first and second sets of light-emitting diodes are housed respectively within first and second housings, said first and second housings having interior reflecting surfaces for directing light from said light-emitting diodes into the length of urethane material.

12. The illumination device of claim 10, in which said first and second sets of light-emitting diodes are embedded in the respective first and second ends of the length of urethane material, and end surfaces of said ends are covered with an internally reflecting material.

13. An optical waveguide system providing for an illumination device simulating the effect of neon or fluorescent lighting, comprising:

an optical waveguide rod of a predetermined length having a characteristic of leaking light directed into an end of said rod out of a lateral surface thereof;

at least one high-intensity point light source adjacent each end of said rod;

said waveguide rod including means for balancing the normal attenuation of emitted light from said ends to near a midpoint of said waveguide rod thereby providing for an emission of light with a substantially uniform intensity along at least a portion of said lateral surface; and a reflective means positioned about each of said point light sources and associated end of said rod for directing essentially all of the light emitted by each point light source into said ends of said waveguide rod.

14. The optical waveguide system of claim 13, in which said means includes optical waveguide material having a scattering material incorporated therein in which said scattering material increases scattering of light away from said point light sources, thereby balancing normal attenuation of light.

15. The optical waveguide system of claim 14, in which said scattering material comprises micro balloons of glass having a different index of refraction than said waveguide material, said micro balloons forming a density gradient within said waveguide material that increases away from said point light sources and reaches a maximum at a point between said light sources whereby light is increasingly scattered along said waveguide rod toward said point.

16. The optical waveguide system of claim 13, in which said means includes spaced notches an said lateral surface, said notches increasing in number in a direction away from said point light sources and reaching a maximum toward a region between said light sources, whereby said notches increase scattering of light through said lateral surface away from said point light sources.

17. The optical waveguide system of claim 13, in which waveguide rod has a channel extending between said ends with an increasing diameter reaching a maximum at a point between said ends, said channel having an internal surface with a semi-reflective coating, said point light sources being positioned so as to cause light to be directed into end surfaces of said waveguide rod, whereby light is progressively directed out of the lateral surface toward said point to balance the attenuation of light by said system.

18. An illumination device for the simulation of neon lighting, comprising:

a length of waveguide material having first and second ends and a light-emitting lateral surface;

a matrix of micro balloons of glass within said length of waveguide material having an index of refraction different therefrom, said matrix having a density gradient that increases from a minimum near said first and second ends to a maximum near a midpoint of said length; and first and second sets of light-emitting diodes associated respectively with said first and second ends of the length of waveguide material for emitting light into said ends, whereby light emitted from said light-emitting surface is substantially uniformly emitted between said first and second ends.

19. The illumination device of claim 18, in which said first and second sets of light-emitting diodes are housed respectively within first and second housings, said first and second housings having interior reflecting surfaces for directing light from said light-emitting diodes into the length of waveguide material.

20. The illumination device of claim 18, in which said first and second sets of light-emitting diodes are embedded in the respective first and second ends of the length of waveguide material, and end surfaces of said ends are covered with an internally reflecting material.

21. The illumination device of claim 18, in which the waveguide material is an acrylic material.

* * * * *

UNITED STATES PATENT AND TRADEMARK OFFICE
CERTIFICATE OF CORRECTION

PATENT NO. : 6,896,398 B2
DATED : May 24, 2005
INVENTOR(S) : Chambers et al.

It is certified that error appears in the above-identified patent and that said Letters Patent is hereby corrected as shown below:

Column 10,
Line 14, change the word "an" to -- on --.

Signed and Sealed this

Sixteenth Day of August, 2005

JON W. DUDAS
*Director of the United States Patent and Trademark Office*